H. G. NELSON.
Fly or Insect Trap.

No. 161,814.  Patented April 6, 1875.

Attest:
Edward Barthel
Wm. T. Spalding

Inventor:
H. G. Nelson
By Atty
Thos. S. Sprague

THE GRAPHIC CO. PHOTO-LITH. 39 & 41 PARK PLACE, N.Y.

UNITED STATES PATENT OFFICE.

HENRY G. NELSON, OF PRAIRIEVILLE, MICHIGAN.

IMPROVEMENT IN FLY OR INSECT TRAPS.

Specification forming part of Letters Patent No. 161,814, dated April 6, 1875; application filed February 12, 1875.

*To all whom it may concern:*

Be it known that I, HENRY G. NELSON, of Prairieville, in the county of Barry and State of Michigan, have invented an Improvement in Fly or Insect Traps, of which the following is a specification:

The nature of this invention relates to certain improvements in the construction of a fly-trap; and its object is to so construct it that the flies in the trap are more hidden from view, and consequently less repulsive to the eye, than in those of the ordinary construction.

Figure 1:
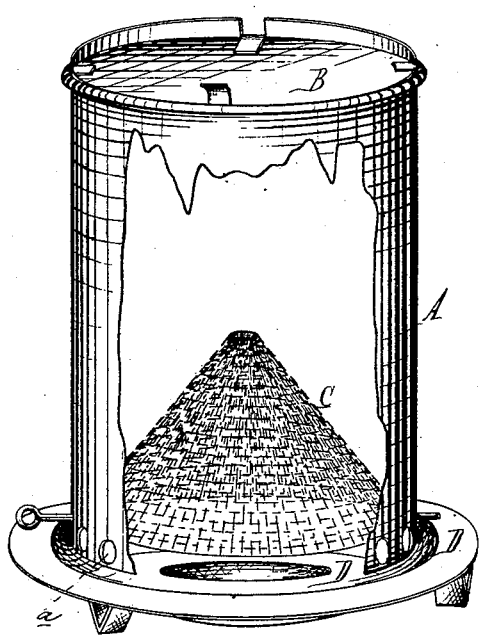
Figure 2:
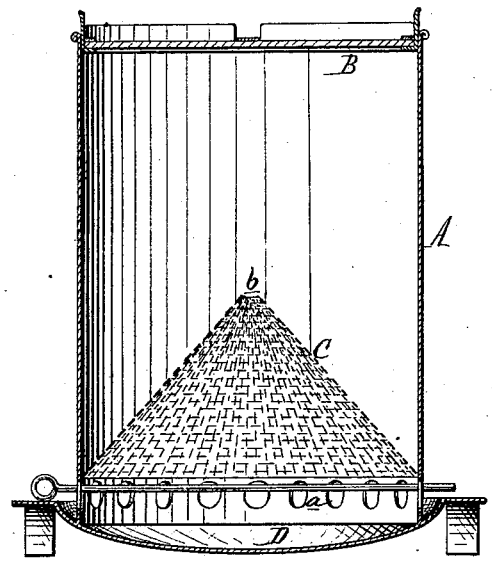

Fig. 1 is a perspective view of my improved fly-trap, with a portion of the wall broken away to show the interior arrangement. Fig. 2 is a vertical section through the center, showing the illuminated top, the cylindrical shell, the feed-basin, and the wire-gauze conical trap.

Like letters indicate like parts in each figure.

In the annexed drawings, A represents a cylinder made of any suitable material, the outer side of which may be ornamented in any desirable manner. Near the base or lower end of this cylinder are a series of holes or small apertures, $a$, and its upper end is closed by the glass plate B. Within this cylinder or shell is secured the cone C, made of wire-cloth, and provided with a small opening, $b$, in its apex. The base of this cone is sufficiently large to fill the interior diameter of the shell, to which it is attached, at a point immediately above the apertures $a$. The lower end of the cylinder rests on the upper side of a depressed bottom, D, to which, in any suitable manner, it should be removably attached. The depression $c$ in this bottom forms a receptacle for bait or attracting-food.

The device being constructed as described, is ready for operation when the bait has been placed in position. The flies are attracted by the food and enter the apertures $a$ to secure it. When they desire to escape, the strong and unobstructed light through glass-plate cover of the cylinder attracts them in that direction, and they enter that portion of the cylinder above the gauze cover, through the opening $b$ in its apex, where they are hidden from a side view by the opaque shell.

What I claim as my invention, and desire to secure by Letters Patent, is—

A fly-trap consisting of the opaque shell A, having the glass-top apertures $a$, and wire-cloth cone C, resting upon and removably secured to the depressed bottom D, constructed and arranged substantially as described and shown.

HENRY G. NELSON.

Witnesses:
  H. S. SPRAGUE,
  WM. P. SPALDING.